No. 817,011. PATENTED APR. 3, 1906.
R. C. SMITH.
FODDER BUNDLE BINDER.
APPLICATION FILED AUG. 19, 1905.
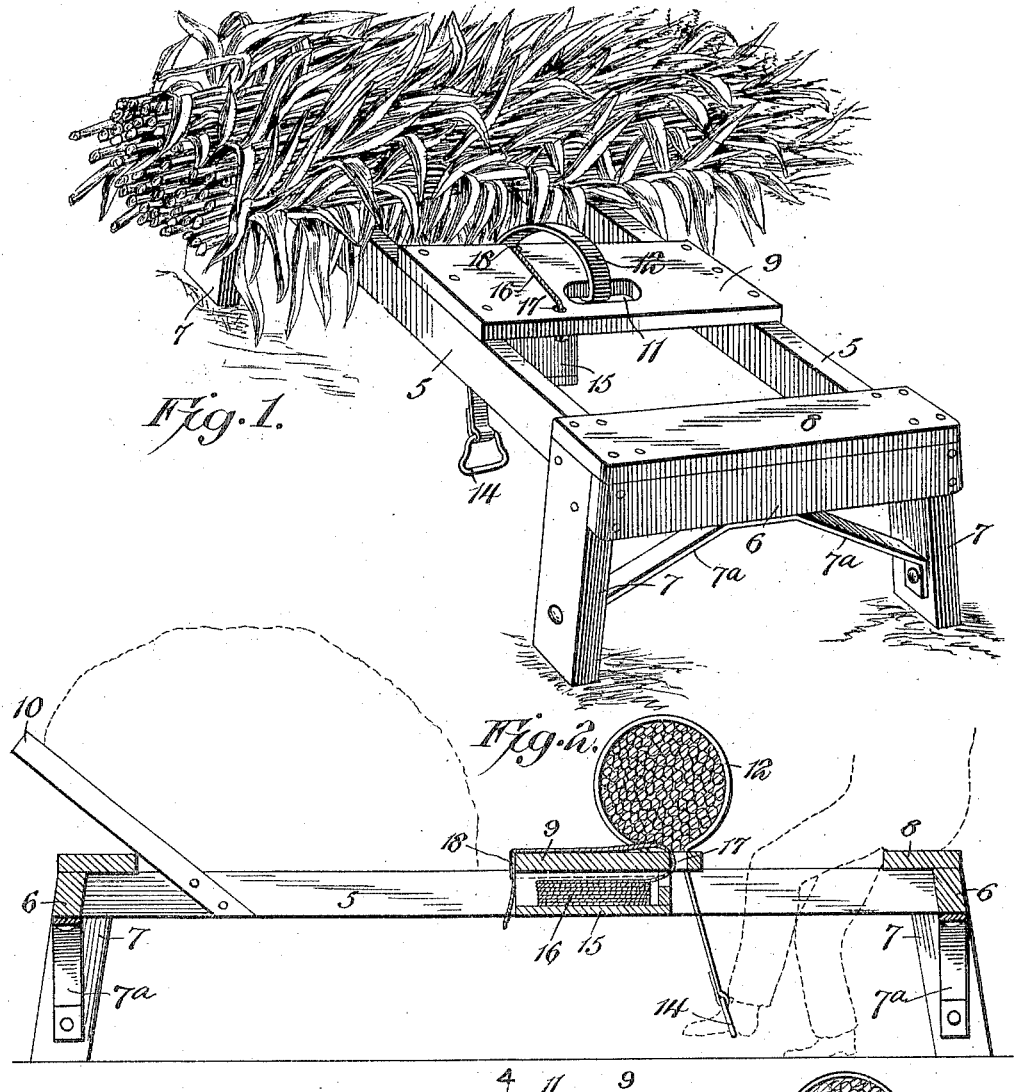
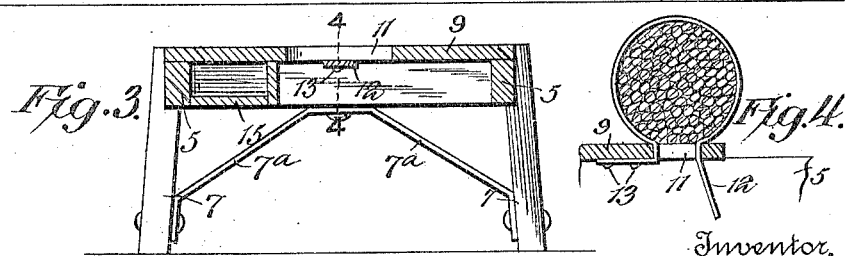

UNITED STATES PATENT OFFICE.

REUBEN C. SMITH, OF NASHVILLE, MICHIGAN.

FODDER-BUNDLE BINDER.

No. 817,011.

Specification of Letters Patent.

Patented April 3, 1906.

Application filed August 19, 1905. Serial No. 274,897.

*To all whom it may concern:*

Be it known that I, REUBEN C. SMITH, a citizen of the United States, residing at Nashville, in the county of Barry and State of Michigan, have invented a new and useful Fodder-Bundle Binder, of which the following is a specification.

This invention relates to improvements in means for binding and tying bundles of corn either prior to their delivery to threshing mechanism or to husking and threshing machines.

The principal object is to provide a simple and novel structure by means of which bundles can be tightly compressed and readily tied with ease and rapidity, doing away with the necessity of the workmen stooping and tying the bundles on the ground.

The embodiment of the invention which is at present considered preferable is illustrated in the accompanying drawings, wherein—

Figure 1 is a perspective view of the apparatus. Fig. 2 is a longitudinal sectional view therethrough. Fig. 3 is a cross-sectional view, and Fig. 4 is a detail sectional view on the line 4 4 of Fig. 3.

Similar reference-numerals designate corresponding parts in all the figures of the drawings.

In the embodiment illustrated, a portable rigid open frame is provided consisting of longitudinal side bars 5, connected by end bars 6 and supported on legs 7, which may be braced, as shown at 7$^a$. A seat 8 is located at one end of the frame, and spaced from said seat is a platform 9, secured to and upon side bars 5. The platform 9 is disposed adjacent to the seat, leaving a sufficient space, however, for a workman, as indicated in Fig. 2. The portion of the frame on the opposite side of said platform constitutes a shock-support and is preferably provided with retaining-stakes 10.

The platform 9 has a slot 11 therethrough, which slot is preferably located near the edge that is adjacent the seat 8. A compressor-strap 12, of leather or other suitable material, is secured, as shown at 13, to the under side of the platform at one side of said slot, said strap passing through the slot and having at its free end a stirrup 14, which is arranged to be passed freely through the slot 11. A twine-holder in the form of a box 15 is secured to and beneath the platform 9, and the twine 16, placed therein, is passed through an opening 17 in the platform at one end of the slot 11, the rear edge of the platform having a recess 18, adapted to receive the free end portion of the twine to properly hold the same in position.

In using the structure the frame is placed on edge against the shock of corn, which is to be divided into bundles, and said shock is then tipped over upon the frame, causing the same to assume the position shown in Fig. 1. The operator then takes his position between the seat 8 and platform 9 and can readily grasp the stalks. If it is desired to husk the corn by hand, said operator, seated on the seat 8, can readily perform this operation, placing the stalks upon the platform 9 as rapidly as the corn is taken therefrom. The compressor-strap is, however, first placed in the position shown in Fig. 1 with the stirrup thrown rearwardly, and the twine is located upon the platform with the free end portion in the recess 18. When a bundle of sufficient proportions has been placed upon the platform, the strap is drawn about the same and the stirrup passed through the slot 11. The workman then placing one foot in the stirrup can snugly compress the bundle, as indicated in Fig. 2, and afterward readily tie the same. The bundle is then thrown to one side and the operation repeated. Of course if the corn is to be husked by machine it is only necessary to divide the shocks into bundles and no hand-husking is done. The structure is thus useful in either case. Moreover, it will be apparent that the bundles can be readily formed, compressed, and tied with ease and rapidity, so that a workman can make a greater number of bundles with considerably less labor and strain than with the old method of tying them on the ground. Moreover, tighter bundles can be formed and less time is used.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a binder of the class described, the combination with a low frame having a seat at one end, and a shock-support at the other, of a platform located on an intermediate portion of the frame in spaced relation to both the seat and support, said platform being low enough to permit an operator seated on the seat to reach over the same and secure the material on the support, and a binding device and twine-holding means located on the portion of the platform that is adjacent to the seat, said shock-support including an upstanding rear member that inclines downwardly toward the platform to direct the material toward said platform.

2. In a binder of the class described, the combination with a frame comprising spaced longitudinal bars and legs supporting the same, of rearwardly-inclined stakes mounted on one end of the frame and projecting above the bars forming therewith a shock-support, a seat located on the other end of the frame, a platform located on the bars between the shock-support and seat, said platform having a slot, a compressing-strap secured at one end to the platform and having a stirrup at its free end that is movable through the slot, and twine-holding means mounted beneath the platform and including devices for maintaining the twine upon said platform longitudinally of the bars, said strap and twine-holding means being located between the bars.

In testimony that I claim the foregoing as my own I have hereto affixed my signature in the presence of two witnesses.

REUBEN C. SMITH.

Witnesses:
RICHARD A. ZEMKE,
H. D. WOTRING.